(12) United States Patent
Ishijima et al.

(10) Patent No.: US 8,162,764 B2
(45) Date of Patent: Apr. 24, 2012

(54) CONSTANT VELOCITY UNIVERSAL JOINT

(75) Inventors: Minoru Ishijima, Iwata (JP); Kenta Yamazaki, Iwata (JP)

(73) Assignee: NTN Corporation, Osaka-Fu (JP)

( * ) Notice: Subject to any disclaimer, the term of this patent is extended or adjusted under 35 U.S.C. 154(b) by 921 days.

(21) Appl. No.: 10/589,284

(22) PCT Filed: Dec. 17, 2004

(86) PCT No.: PCT/JP2004/019473
§ 371 (c)(1),
(2), (4) Date: Jun. 20, 2008

(87) PCT Pub. No.: WO2005/078302
PCT Pub. Date: Aug. 25, 2005

(65) Prior Publication Data
US 2008/0248884 A1    Oct. 9, 2008

(30) Foreign Application Priority Data

Feb. 13, 2004  (JP) .................................. 2004-037380
Feb. 13, 2004  (JP) .................................. 2004-037391

(51) Int. Cl.
*F16D 3/223*    (2011.01)
(52) U.S. Cl. ........................................ 464/145; 464/906
(58) Field of Classification Search .................. 464/139, 464/141–146, 906
See application file for complete search history.

(56) References Cited

U.S. PATENT DOCUMENTS

| | | | |
|---|---|---|---|
| 5,855,519 A | 1/1999 | Kadota | |
| 6,120,382 A | 9/2000 | Sone et al. | |
| 6,267,682 B1 | 7/2001 | Sone et al. | |
| 6,299,542 B1 | 10/2001 | Ouchi et al. | |
| 6,332,844 B1 * | 12/2001 | Hayama et al. | 464/145 |
| 6,383,082 B1 | 5/2002 | Déclas | |
| 6,386,983 B1 * | 5/2002 | Sone et al. | 464/145 |
| 6,402,623 B2 * | 6/2002 | Ouchi et al. | 464/145 |
| 6,478,683 B1 | 11/2002 | Ouchi et al. | |
| 2001/0021671 A1 | 9/2001 | Ouchi et al. | |
| 2001/0024976 A1 | 9/2001 | Ouchi et al. | |
| 2002/0022528 A1 | 2/2002 | Nakagawa et al. | |

(Continued)

FOREIGN PATENT DOCUMENTS

EP    0 950 824 A2    10/1999

(Continued)

OTHER PUBLICATIONS

Supplementary European Search Report issued Aug. 11, 2009 in counterpart European Application No. 04 80 7828.

(Continued)

*Primary Examiner* — Gregory Binda
*Assistant Examiner* — Josh Skroupa
(74) *Attorney, Agent, or Firm* — Wenderoth, Lind & Ponack, L.L.P.

(57) ABSTRACT

An object of the present invention is to ensure the miniaturization, strength, durability, load-carrying capacity, and an operating angle of a constant velocity universal joint. Six balls 3 are disposed in the constant velocity universal joint. The ratio r1 ($=PCD_{BALL}/D_{BALL}$) between the pitch circle diameter $PCD_{BALL}$ ($PCD_{BALL}=2 \times PCR$) of the ball 3 and the diameter $D_{BALL}$ thereof is set in a range of $1.5 \leq r1 \leq 4.0$. The ratio r2 ($=D_{OUTER}/PCD_{SERR}$) between the outside diameter $D_{OUTER}$ of an outer member 1 and the pitch circle diameter $PCD_{SERR}$ of serrations (or splines) 2d of an inner joint member 2 is set in a range of $3.0 \leq r2 \leq 5.0$.

4 Claims, 10 Drawing Sheets

U.S. PATENT DOCUMENTS

| | | |
|---|---|---|
| 2002/0032064 A1 | 3/2002 | Sone et al. |
| 2003/0083135 A1 | 5/2003 | Yamazaki et al. |
| 2005/0148397 A1 | 7/2005 | Nakagawa et al. |

FOREIGN PATENT DOCUMENTS

| | | |
|---|---|---|
| EP | 1 548 309 A1 | 6/2005 |
| EP | 1 770 298 A1 | 4/2007 |
| FR | 2 792 045 | 10/2000 |
| JP | 9-177813 | 7/1997 |
| JP | 9-317783 | 12/1997 |
| JP | 11-182569 | 7/1999 |
| JP | 2000-55069 | 2/2000 |
| JP | 2002-13544 | 1/2002 |
| JP | 2003-130082 | 5/2003 |

OTHER PUBLICATIONS

International Search Report issued May 17, 2005 in International Application No. PCT/JP2004/019473.

Notification of Transmittal of Translation of the International Preliminary Report on Patentability and Written Opinion of the International Searching Authority (forms PCT/IB/338, PCT/IB/373 and PCT/IB/237.

\* cited by examiner

FIG. 8(a)
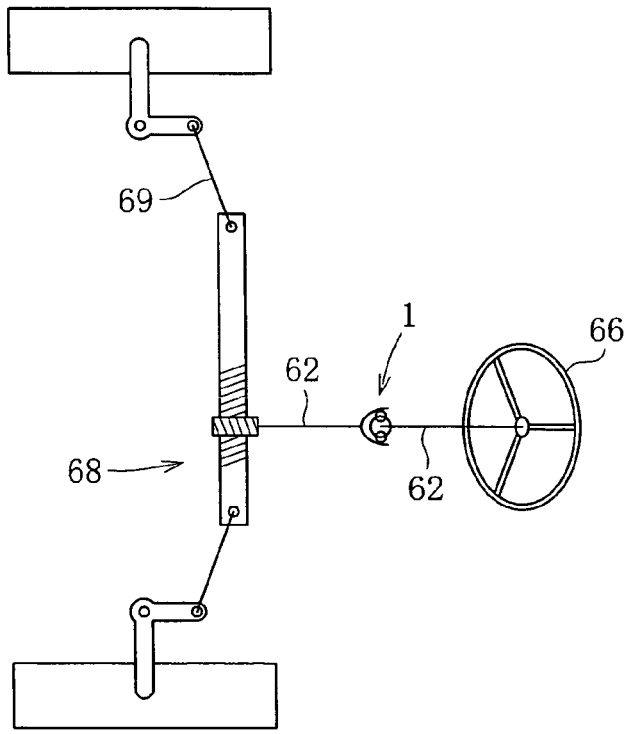
FIG. 8(b)
FIG. 8(c)
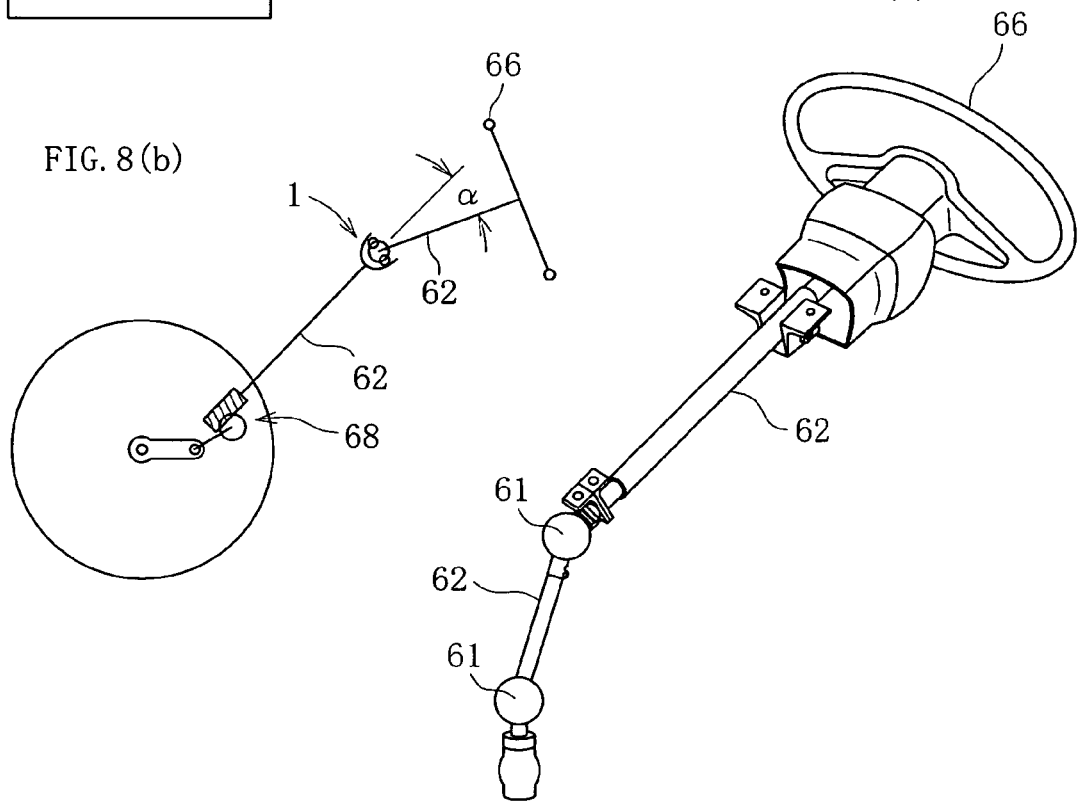

CONSTANT VELOCITY UNIVERSAL JOINT

TECHNICAL FIELD

The present invention relates to a constant velocity universal joint which can be used as, for example, a shaft coupling for steering of an automobile.

BACKGROUND ART

In a steering shaft for an automobile, for example, a plurality of Cardan joints (cross shaft couplings) was generally used. The Cardan joint is a not-constant velocity universal joint in which the larger an operating angle, the larger the rotational fluctuation between an input axis and an output axis becomes. Ensuring constant velocity by combining a plurality of Cardan joints causes a problem that flexibility in vehicle design is impaired.

Using a fixed-type constant velocity universal joint as a shaft coupling for steering has the advantage that the flexibility in vehicle design increases because constant velocity is ensured at any operating angle.

FIG. 9 shows a fixed-type constant velocity universal joint (Rzeppa-type constant velocity universal joint: ball fixed joint) which is conventionally used as a coupling joint of a drive shaft and the like in an automobile. The constant velocity universal joint comprises: an outer member 11 in which six curved track grooves 11b are formed in a spherical inside diameter surface 11a thereof in an axial direction; an inner joint member 12 in which six curved track grooves 12b are formed in a spherical outside diameter surface 12a in the axial direction, and an engagement section 12c having teeth (serrations or splines) are formed in an inside diameter surface thereof; six torque transmission balls 13 which are disposed in respective six ball tracks, which are formed by the synergy between the track grooves 11b of the outer member 11 and the track grooves 12b of the inner joint member 12 corresponding to the track grooves 11b; and a retainer 14 which has pockets 14c for holding the torque transmission balls 13.

The center A of the track groove 11b of the outer member 11 with respect to the spherical center of the inside diameter surface 11a and the center B of the track groove 12b of the inner joint member 12 with respect to the spherical center of the outside diameter surface 12a are offset oppositely to each other (the center A is offset on the side of an opening of the joint, and the center B is offset on the side of a deeper side of the joint in an example shown in the drawing) at the same distance in the axial direction. Thus, the ball track, which is formed by the synergy between the track groove 11b and the track groove 12b corresponding thereto, is in the shape of a wedge opening to one of the axial directions (on the side of the opening of the joint in the example shown in the drawing). Both of the spherical center of the inside diameter surface 11a of the outer member 11 and the spherical center of the outside diameter surface 12a of the inner joint member 12 are in a joint center plane O including the center of the torque transmission ball 13.

Even if the outer member 11 is displaced from the inner joint member 12 at an angle θ, the torque transmission balls 13 guided by the retainer 14 are always maintained in a bisector plane (θ/2) of the angle θ at any operating angle θ, and hence the constant velocity of the joint is ensured.

In this kind of fixed-type constant velocity universal joint, by the way, there are clearances between the track groove of the outer member and the ball and between the track groove of the inner member and the ball by the reasons of function and processing. This track clearance appears when one of the inner member and the outer member is fixed in a neutral state of the joint, and the other one is moved in the axial direction or is rotated in a circumferential direction.

The track clearance has large effect on the wobbliness (rotation backlash) between the inner member and the outer member in the circumferential direction. Since the track clearance is indispensable in the fixed-type constant velocity universal joint for the reasons of processing tolerance and assembly, the rotational backlash becomes large. Accordingly, it is a concern that using the joint as a steering joint for the automobile as-is may cause deterioration in steering operability in the vicinity of straight-ahead driving of a vehicle and the occurrence of unusual noise.

As a mean to solve this problem, a fixed-type constant velocity universal joint is proposed in which preload means provided inside the joint fills an axial clearance caused by the track clearance in order to restrain the rotational backlash (refer to, for example, Patent Document 1).

In the constant velocity universal joint having such preload means, which always make the balls contact the ball tracks to restrain the rotational backlash, inside the joint, a first object of the present invention is to further miniaturize the joint and ensure sufficient strength, load-carrying capacity, and durability in order to provide a constant velocity universal joint especially suitable for a steering shaft of an automobile.

Next, a second object of the present invention will be described. FIG. 10 shows the retainer 14 of the constant velocity universal joint described above. The retainer 14 has six window-shaped pockets 14c for holding the torque transmission balls 13 in circumferentially equidistant positions. Both circumferential sides of the pocket 14c are pillar sections 14d. Generally, the pockets 14c of the retainer 14 were cut by a press, and then a pair of axial walls 14c1 {refer to FIG. 10(b)} opposed in the axial direction was subjected to finishing processing by shaving (broach). In this case, the axial initial clearance between the pocket 14c and the torque transmission ball 13 is set at −50 μm to −10 μm by processing the axial walls 14c1. If there are variations in a processing margin of the axial wall 14c1, however, the center positions of the pockets 14c are misaligned among the pockets 14c arranged in the circumferential direction, so that the so-called pocket staggered state occurs and the strength and durability of the retainer 14 become worse. Therefore, a radius of curvature R in corner round sections 14c3 of the pocket 14c is made small, and straight sections 14c4 are left. The axial dimension δ between the axial wall 14c1 and the straight section 14c4 is controlled to prevent the occurrence of the so-called pocket staggered state. Accordingly, making the radius of curvature R of the corner round section 14c3 small results in the extension of a pocket area to an originally functionally unnecessary part.

Accordingly, since the pocket area is too large for its function, the pillar sections of the retainer are under high stress. The surface areas of an inside diameter surface and an outside diameter surface become small, so that there is a concern that sufficient strength and durability of the retainer cannot be ensured.

In the constant velocity universal joint having preload means for always making the balls contact the ball tracks, a second object of the present invention is to optimize pocket structure without impairing the function of the retainer in order to increase the strength and durability of the retainer, and by extension the strength and durability of the joint.

Patent Document 1: Japanese Patent Laid-Open Publication No. 2003-130082

DISCLOSURE OF THE INVENTION

Problems to be Solved by the Invention

To solve the foregoing first object, a constant velocity universal joint according to a first invention of this application comprises: an outer member which is provided with a spherical inner surface in which a plurality of track grooves are formed; an inner member which is provided with a spherical outer surface in which a plurality of track grooves are formed; balls disposed in a wedge-shaped ball track which is formed by the synergy between the track groove of the outer member and the track groove of the inner member; a retainer disposed between the spherical inner surface of the outer member and the spherical outer surface of the inner member to hold the balls; a press section which is provided in the inner member and applies elastic pressure in an axial direction; and a receiver section which is provided in the retainer and receives the pressure from the press section. The constant velocity universal joint is characterized in that a ratio r1 ($=PCD_{BALL}/D_{BALL}$) of a pitch circle diameter ($PCD_{BALL}$) of the ball to a diameter ($D_{BALL}$) of the ball is in a range of $1.5 \leq r1 \leq 4.0$.

The pitch circle diameter ($PCD_{BALL}$) of the ball is twice ($PCD_{BALL} = 2 \times PCR$) as long as the length of a segment connecting the center of the track groove of the outer joint member or the center of the track groove of the inner member and the center of the ball {the length of a segment connecting the center of the track groove of the outer joint member and the center of the ball is equal to the length of a segment connecting the center of the track groove of the inner member and the center of the ball. Thus, constant velocity of the joint is ensured. This length will be hereinafter called (PCR)}.

The reason of $1.5 \leq r1 \leq 4.0$ is that it is difficult for the constant velocity universal joint to extensively vary the PCD of the ball within the confines of limited space, and the value of r1 mainly depends on the diameter of the ball. Since the constant velocity universal joint for steering is used within the confines of low load torque in comparison with a conventional constant velocity universal joint, the inner and outer member can be thinner. In case of r1<1.5, however, the thickness of the outer member, the inner member, or the like becomes too thin, so that there is a concern about a lack of strength. In case of 4.0<r1, the load-carrying capacity of the ball and each track surface becomes small, so that there is a concern about durability.

In other words, it is difficult for the constant velocity universal joint to extensively vary the pitch circle diameter ($PCD_{BALL}$) of the ball within the confines of limited space. Thus, the value of r1 mainly depends on the diameter ($D_{BALL}$) of the ball. In case of r1<1.5 (generally when the diameter $D_{BALL}$ of the ball is large), the thickness of another member (the outer member, the inner member, or the like) becomes too thin, so that there is concern about lack of strength. Contrarily in case of r1>4.0 (generally when the diameter $D_{BALL}$ is small), the load-carrying capacity becomes small, so that there is concern about durability. $1.5 \leq r1 \leq 4.0$ makes it possible to sufficiently ensure the strength of the outer member and the like and the load-carrying capacity and durability of the joint. This is corroborated by tests.

TABLE 1

| r1 | 1.1 | 1.5 | 1.9 | 2.3 | 2.7 | 3.1 | 3.5 | 3.9 |
|---|---|---|---|---|---|---|---|---|
| durability | ○ | ○ | ○ | ○ | ○ | ○ | ○ | ○ |
| strength of outer ring | X | Δ | Δ | ○ | ○ | ○ | ○ | ○ |
| strength of inner ring | X | Δ | Δ | ○ | ○ | ○ | ○ | ○ |
| strength of retainer | X | Δ | Δ | ○ | ○ | ○ | ○ | ○ |

○: good Δ: fair X: no good (six balls)

As shown in Table 1 (Table 1 shows evaluations based on comparative tests), in the case of r1=1.1, the strength of the outer member, the inner member, and the retainer is not sufficiently ensured, and undesirable results are obtained. In the cases of r1=1.5 and 1.9, tolerable results are obtained in respect of strength. Especially in case of $r1 \geq 2.3$, the strength of the inner member, the outer member, and the retainer and the durability of the joint are sufficiently ensured, and desirable results are obtained. The tests are not carried out in a range of r1>3.9, but it is assumed that desirable results are obtained as with above. In case of r1>4.0, however, durability seems to be a problem, so that $r1 \leq 4.0$ is desirable.

As described above, r1 should be set in a range of $1.5 \leq r1 \leq 4.0$, and more preferably in a range of $2.3 \leq r1 \leq 4.0$.

The reason why r1 is set in a range of 1.5 to 4.0 times is because the strength of an inner ring 2 is reduced when r1 is less than 1.5 times. When r1 is more than 4.0 times, on the other hand, there occurs the inconvenience that the strength of the retainer 4 is reduced and also the outside diameter of the outer joint member becomes large.

According to a second invention of this application, in addition to the foregoing structure, a ratio r2 ($=D_{OUTER}/PCD_{SERR}$) of an outside diameter ($D_{OUTER}$) of the outer joint member to a pitch circle diameter ($PCD_{SERR}$) of teeth of coupling serrations formed in the inside diameter surface of the inner member is in a range of $3.0 \leq r2 \leq 5.0$.

The reason of $3.0 \leq r2 \leq 5.0$ is as follows. The pitch circle diameter ($PCD_{SERR}$) of the teeth of the inner member cannot be extensively varied in relation to the strength of the other axis and the like. Thus, the value of r2 mainly depends on the outside diameter ($D_{OUTER}$) of the outer joint member. In case of r2<3.0 (generally when the outside diameter $D_{OUTER}$ is small), the thickness of each member (the outer member, the inner member, or the like) becomes too thin, so that there is a concern about strength. In the case of r2>5.0 (generally when the outside diameter $D_{OUTER}$ is large), on the other hand, a practical problem may occur due to its dimensions and the like, and the object of miniaturization cannot be achieved. $3.0 \leq r2 \leq 5.0$ can ensure the strength of the outer member and the like and the durability of the joint, and also satisfy a practical request.

As described above, it is desirable that r2 is set in a range of $3.0 \leq r2 \leq 5.0$.

According to a third invention of this application, the center of the track groove of the outer joint member with respect to a spherical center of an inside diameter surface and the center of the track groove of the inner member with respect to the spherical center of an outside diameter surface are offset oppositely to each other at the same distance (F) in an axial direction. A ratio R1 ($=F/PCR$) between the foregoing offset amount (F) and the foregoing (PCR) is in a range of $0.109 \leq R1 \leq 0.162$.

The reason of $0.109 \leq R1 \leq 0.162$ is as follows. Assuming that PCR is fixed, a track load (a load applied to a contact section between the track groove and the ball) is generally reduced with increase in the offset amount (F) in giving an operating angle. Therefore, the large offset amount (F) has an advantage in respect of the track load.

However, if the offset amount (F) is too large: (1) a track becomes shallow in a large operating angle region, and hence allowable load torque is reduced; (2) a movement amount of the ball in the direction of the diameter increases in the pocket of the retainer, so that it becomes necessary to increase the thickness (dimension in the direction of the diameter) of the retainer in order to prevent the ball from dropping off. Thus, the track becomes shallow, and the allowable load torque is reduced; (3) a movement amount of the ball in a circumferential direction increases in the pocket of the retainer, so that it becomes necessary to extend the circumferential dimension of the pocket of the retainer in order to ensure the proper movement of the ball. Thus, pillar sections of the retainer become narrow, and there is a problem of strength.

If the offset amount (F) is too small, on the other hand: (4) peak values of a track load (P1) on a loaded side and a track load (P2: a phase for applying a load to a track on an unloaded side occurs during a single rotation) on an unloaded side increase (P1 and P2 indicate the peak values at predetermined phase angles), and hence durability is reduced; and (5) a maximum operating angle is reduced.

As described above, the offset amount (F) is desirable neither too large nor too small, an optimum range exists by striking a balance between the foregoing problems (1) to (3) and the foregoing problems (4) and (5). Since the optimum range of the offset amount (F) varies with the size of the joint, it is necessary to get the optimum range in relation to fundamental dimensions representing the size of the joint. Accordingly, this is the reason why the ratio R1 (=F/PCR) between the track offset F and the dimension of PCR is used. The foregoing (1) to (3) matter in R1>0.162, and the foregoing (4) and (5) matter in R1<0.109. The optimum range of the offset amount (F) is $0.109 \leq R1 \leq 0.162$ in terms of ensuring the allowable load torque, ensuring the strength of the retainer, reduction in the track load, ensuring durability, and ensuring the maximum operating angle.

A fourth invention of the present application is characterized in that the number of the torque transmission balls is equal to or less than six, and a contact angle (θ) between the track and the ball is in a range of $30° \leq \theta \leq 40°$.

The constant velocity universal joint for steering is always used at a large operating angle, in contrast to that for a drive shaft. In the specifications of the conventional universal joint for the drive shaft which is used around a contact angle of 45°, a contact ellipse between the track groove and the ball runs onto a track edge under a heavy load, and the allowable load torque of inner and outer ring tracks at a large angle region becomes short, so that there is a concern about durability. As a measure for solving this problem, to prevent the contact ellipse from running onto the track edge under the heavy load even in the large angle area, setting the contact angle (θ) at the range of $30° \leq \theta \leq 40°$ can achieve improvement in an allowable load torque diagram.

Fifth to seventh inventions of the present application are combinations of the foregoing first invention and eighth to tenth inventions of the present application described below.

To solve the foregoing second object, a constant velocity universal joint according to the eighth invention of this application comprises: an outer member which is provided with a spherical inner surface in which a plurality of track grooves are formed; an inner member which is provided with a spherical outer surface in which a plurality of track grooves are formed; balls disposed in a wedge-shaped ball track which is formed by the synergy between the track groove of the outer member and the track groove of the inner member; and a retainer disposed between the spherical inner surface of the outer member and the spherical outer surface of the inner joint member to hold the balls. The ball always makes contact with the ball track by preload applying means. In such a constant velocity universal joint, the ball track is open to one of the axial directions in the shape of a wedge. A pocket of the retainer has corner round sections, and a ratio (R/d) between a radius of curvature R of the corner round section and a diameter d of the torque transmission ball is $R/d \geq 0.22$.

The reason why the ratio (R/d) is in the foregoing range is as follows. FIG. 7 shows the results of FEM analysis indicating the relationship between the ratio (R/d) and a maximum principal stress load applied to a pillar section (an interval section between the pockets adjoining in a circumferential direction). From the results shown in the drawing, it was recognized that a diagram of {(R/d)-(maximum principal stress load)} took a minimum value at R/d=0.537. It was confirmed that the maximum principal stress load of the pillar section was theoretically minimized at R/d=0.537.

As shown in Table 2, on the basis of the analysis results, an R dimension satisfying R/d=0.537 was obtained at each size of the torque transmission ball.

Furthermore, since the general tolerance (general tolerance: when classification of standard dimensions exceeds 6 mm, allowable tolerance is ±1 mm) of the R dimension is ±1 mm, the maximum value and the minimum value of the R dimension were obtained, and then the maximum value and the minimum value of R/d corresponding to each value were obtained (the typical value of R/d was an average value of the maximum value and the minimum value). As a result, $0.45 \leq R/d \leq 0.62$ was obtained as the desirable range of R/d. On the other hand, a conventional retainer shown in FIG. 10 satisfies R/d=0.21, and the reduction effect of the maximum principal stress load can be expected at $R/d \geq 0.22$.

Therefore, the ratio (R/d) was set in a range of $R/d \geq 0.22$, and more preferably in a range of $0.45 \geq R/d \geq 0.62$. Setting the ratio (R/d) in the foregoing range makes it possible to minimize pocket space without impairing the function (operability of the torque transmission balls) of the retainer, and hence it is possible to increase the surface areas of an inside diameter surface and an outside diameter surface of the retainer. Accordingly, it is possible to increase the strength and durability of the retainer in cooperation with the reduction effect of the maximum principal stress load in the pillar section.

TABLE 2

| ball diameter (d) | R dimension | | | R/d | | |
| --- | --- | --- | --- | --- | --- | --- |
| | O. 537d | maximum value | minimum value | upper limit | medium | lower limit |
| 12.7 | 6.8 | 7.8 | 5.8 | 0.614 | 0.535 | 0.457 |
| 14.287 | 7.7 | 8.7 | 6.7 | 0.609 | 0.539 | 0.469 |
| 15.081 | 8.1 | 9.1 | 7.1 | 0.603 | 0.537 | 0.471 |
| 15.875 | 8.5 | 9.5 | 7.5 | 0.598 | 0.535 | 0.472 |
| 16.669 | 9 | 10 | 8 | 0.6 | 0.54 | 0.48 |
| 17.462 | 9.4 | 10.4 | 8.4 | 0.596 | 0.538 | 0.481 |
| 18 | 9.7 | 10.7 | 8.7 | 0.594 | 0.539 | 0.483 |
| 19.05 | 10.2 | 11.2 | 9.2 | 0.588 | 0.535 | 0.483 |
| 19.844 | 10.7 | 11.7 | 9.7 | 0.59 | 0.539 | 0.489 |
| 20.638 | 11.1 | 12.1 | 10.1 | 0.586 | 0.538 | 0.489 |
| general torerance: -± (exceedsR6) | | | | 0.58~0.614 | 0.535~0.54 | 0.457~0.496 |

The ninth invention of the present application provides a structure in which the pocket of the retainer has corner round sections, and the ratio (R/d) between the radius of curvature R of the corner round section and the diameter d of the torque transmission ball is $R/d \geq 0.22$, and more preferably $0.45 \leq R/d \leq 0.62$. This invention may be applied to a constant velocity universal joint with a straight section which has a straight fillet in each track groove of the outer member and the inner joint member. The other matters are the same as those in the constant velocity universal joint of the invention described above.

In the constant velocity universal joint according to the present invention, the torque transmission balls are integrated as follows. Relatively varying the angle between the outer member and the inner member, in such a state that the pocket of the retainer faces to the outside from an opening section of the outer member on one side, the torque transmission ball is integrated into the pocket of the retainer and the ball track. When the angle between the outer member and the inner member relatively varies, the torque transmission balls held in the pockets of the retainer relatively move in the circumferential direction. Thus, it is necessary to set the circumferential length of the pockets of the retainer in such a manner that the already integrated torque transmission ball relatively moving in the circumferential direction does not interfere with circumferential walls of the pocket of the retainer during integrating the torque transmission balls (the displacement angle between the outer member and the inner member at this time is called "ball integration angle").

Since the six pockets of the retainer can be composed of one kind of pocket, the circumferential lengths thereof are the same. Setting the ratio (R/d) at a value in the foregoing range, as described above, can improve the strength and durability of the retainer, so that it is also possible to equalize the circumferential lengths of all six pockets (the same length as the foregoing second pocket) as in the tenth invention of this application.

Of the walls of the pocket of the retainer, it is preferable that at least a pair of axial walls opposed in an axial direction of the retainer are formed by cutting after heat treatment of the retainer. "Cutting" here includes grinding, cutting by quenched steel, and the like. Accordingly, since variations in a processing margin of the axial wall are reduced, it is possible to eliminate a straight section, which is provided in conventional pocket structure to control the processing margin of the axial wall. Thus, it is possible to increase the radius of curvature of the corner round section, and hence set the ratio (R/d) at a value in the foregoing range.

Advantage of the Invention

According to the first invention, it is possible to further miniaturize the size of the constant velocity universal joint and to sufficiently ensure strength, load-carrying capacity, durability, and an operating angle in the constant velocity universal joint which has preload means inside the joint for always making the balls contact the ball tracks to restrain rotational backlash.

According to the eighth invention, the structure of the pocket can be optimized without impairing the function of the retainer, so that it is possible to increase the strength and durability of the retainer, and by extension the strength and durability of the joint.

BRIEF DESCRIPTION OF THE DRAWINGS

FIG. 8(a) is a plan view of a steering device;
FIG. 8(b) is a side view of the steering device;
FIG. 8(c) is a perspective view of the steering device.

BEST MODE FOR CARRYING OUT THE INVENTION

Figure 1:
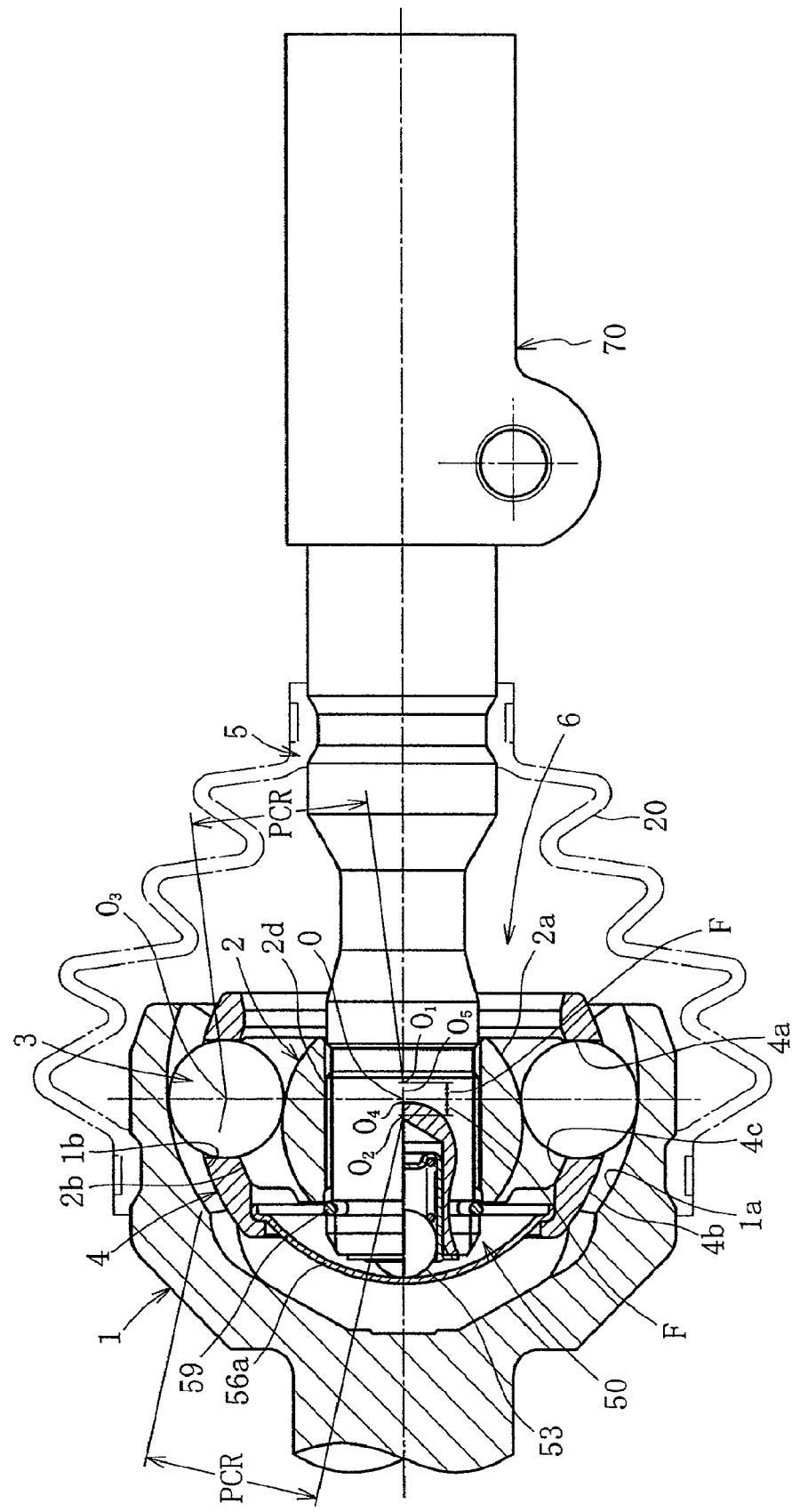
FIG. 1 is a longitudinal sectional view of a constant velocity universal joint for steering to which the present invention is applied.
Figure 2:
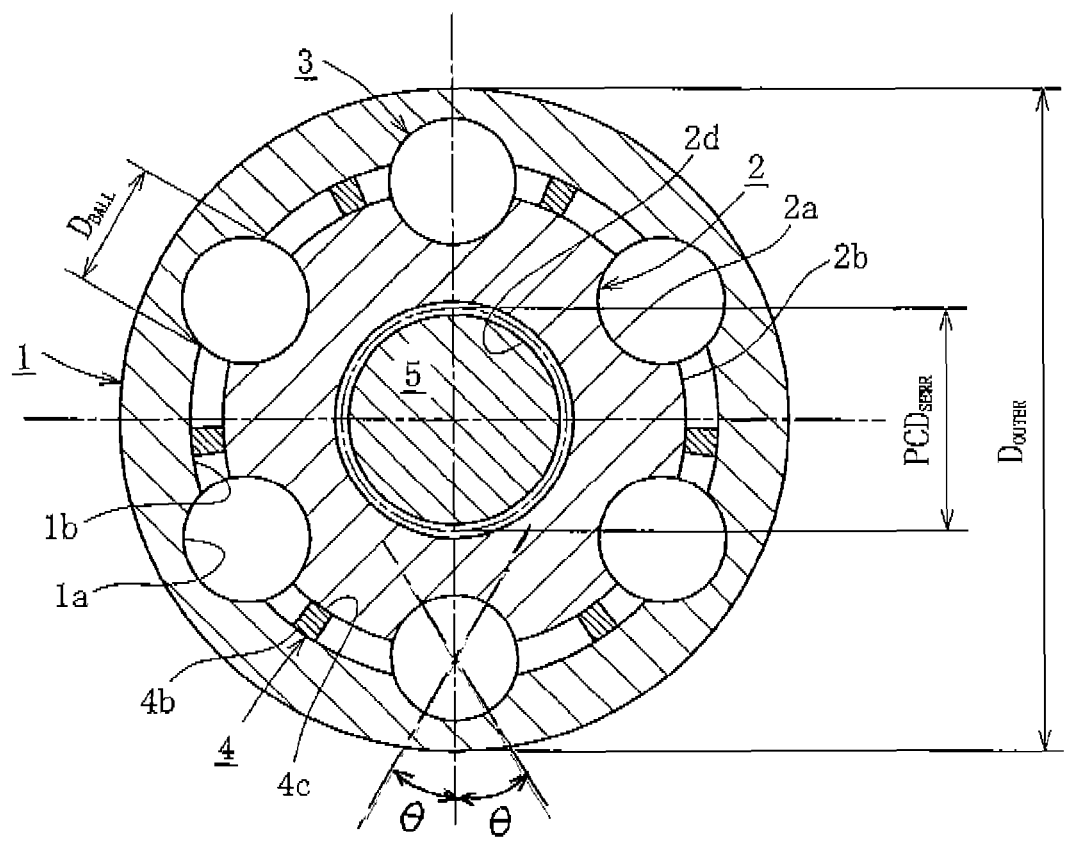
FIG. 2 is a cross sectional view of the joint of FIG. 1.

An embodiment of the present invention will be hereinafter explained with reference to drawings.

The embodiment of a constant velocity universal joint according to the present invention will be described in detail. The embodiment described below takes a case where the present invention is applied to a Rzeppa-type (BJ), being a kind of fixed-type constant velocity universal joint, as an example. The present invention, however, is not limited to that, and is also applicable to an undercut free joint (UJ). A constant velocity universal joint according to the present invention is available for not only steering but also a drive shaft and a propeller shaft.

First, a steering device in which the fixed-type constant velocity universal joint is installed will be explained in brief. The steering device, as shown in FIGS. 8(a) to (c), transmits the rotational motion of a steering wheel 66 to a steering gear 68 through a steering column composed of one or a plurality of steering shafts 62 for the purpose of converting the rotational motion into the reciprocating motion of a tie rod 69. In the case where the steering shafts 62 cannot be disposed in a straight line due to mounting space or the like, one or a plurality of shaft couplings is disposed between the steering shafts 62 so as to be able to transmit correct rotational motion to the steering gear 68 even in a state of bending the steering shafts 62. In the embodiment of the present invention, the fixed-type constant velocity universal joint is used as the shaft coupling 61. A symbol α in FIG. 8(b) represents a bend angle of the joint, and a large bend angle exceeding 30° can be set. The steering device may be an electric power steering device (EPS) in which a motor applies auxiliary power, or may be a hydraulic power steering device.

A fixed-type constant velocity universal joint for steering according to the embodiment of the present invention, as shown in FIG. 1, has a connecting shaft 5 with a yoke 70 connected to a steering shaft. The fixed-type constant velocity universal joint is configured to include: an outer member 1 being an outer joint member in which six curved track grooves 1a are formed in a spherical inside diameter surface 1b in an axial direction; an inner joint member 2 in which six curved track grooves 2a are formed in a spherical outside diameter surface 2b in the axial direction, and an engagement section 2d having teeth (serrations or splines) for coupling the connecting shaft 5 are formed in an inside diameter surface; six torque transmission balls 3 disposed in six ball tracks which are formed by the synergy between the track grooves 1a of the outer member 1 and the track grooves 2a of the inner joint member 2 corresponding to the track grooves 1a; and a retainer 4 which holds the torque transmission balls 3.

An axial end section of the connecting shaft 5 engages with the engagement section 2d of the inner joint member 2 with teeth (serration engagement or spline engagement). The inner joint member 2 and the connecting shaft 5 compose an inner member 6.

A rubber or resin boot 20 is attached between the outer member 1 and the connecting shaft 5 to prevent the entry of dust and the like into the joint.

In this embodiment, the center $O_1$ of the track groove 1a of the outer member 1 with respect to the spherical center of the inside diameter surface 1b and the center $O_2$ of the track groove 2a of the inner joint member 2 with respect to the spherical center of the outside diameter surface 2b are offset oppositely to each other (the center $O_1$ is on the side of an opening of the joint, and the center $O_2$ is on a deeper side of the joint in an example shown in the drawing) at the same distance (F) in the axial direction. Thus, the ball track, which is formed by the synergy between the track groove 1a and the track groove 2a corresponding thereto, is in the shape of a wedge opening to one of the axial directions (on the side of the opening of the joint in the example shown in the drawing). Both of the spherical center of an outside diameter surface 4b of the retainer 4 and the spherical center of the inside diameter surface 1b of the outer member 1 being a guide surface of the outside diameter surface 4b of the retainer 4 are in a joint center plane O including the center $O_3$ of the ball 3. Also, both of the spherical center of an inside diameter surface 4c of the retainer 4 and the spherical center of the outside diameter surface 2b of the inner joint member 2 being a guide surface of the inside diameter surface 4c of the retainer 4 are in the joint center plane O. Accordingly, the foregoing offset amount (F) of the outer member 1 is the axial distance between the center $O_1$ of the track groove 1a and the joint center plane O. The foregoing offset amount (F) of the inner joint member 2 is the axial distance between the center $O_2$ of the track groove 2a and the joint center plane O, and hence both offset amounts are equal. The center $O_1$ of the track groove 1a of the outer member 1 and the center $O_2$ of the track groove 2a of the inner joint member deviate oppositely (the center $O_1$ of the track groove 1a is on the side of the opening of the joint, and the center $O_2$ of the track groove 2a is on the deeper side of the joint) at the same distance (F) with respect to the joint center plane O in the axial direction. Each of the length of a segment connecting the center $O_1$ of the track groove 1a of the outer member 1 and the center $O_3$ of the ball 3 and the length of a segment connecting the center $O_2$ of the track groove 2a of the inner member 2 and the center $O_3$ of the ball 3 is PCR. Both lengths are equal.

When the outer member 1 is displaced from the inner joint member 2 at an angle θ, the balls 3 guided by the retainer 4 are always maintained in a bisector plane (θ/2) of the angle θ at any operating angle θ, and hence the constant velocity of the fixed-type constant velocity universal joint is ensured.

Figure 3:
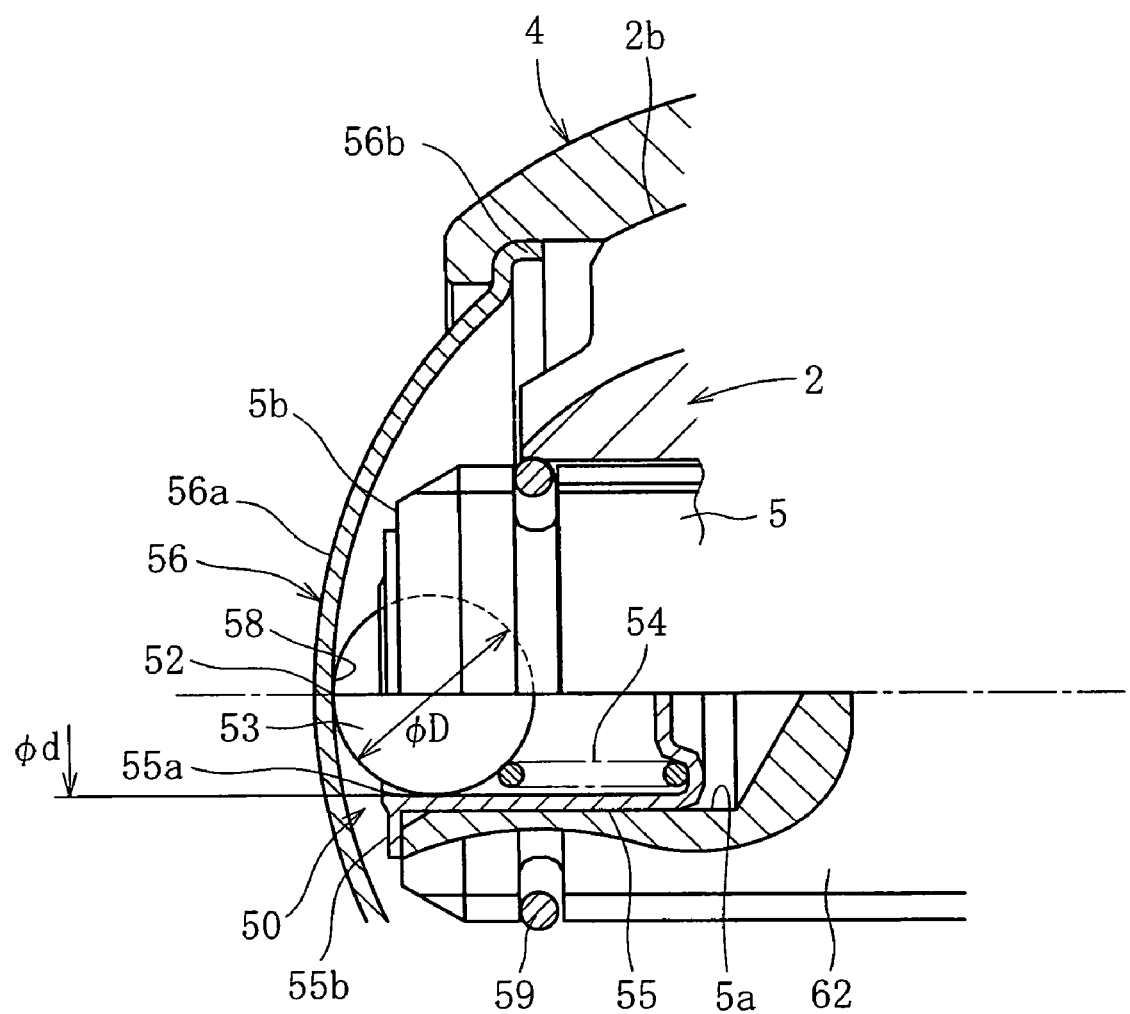
FIG. 3 is a sectional view of a plunger unit section.
Figure 4:
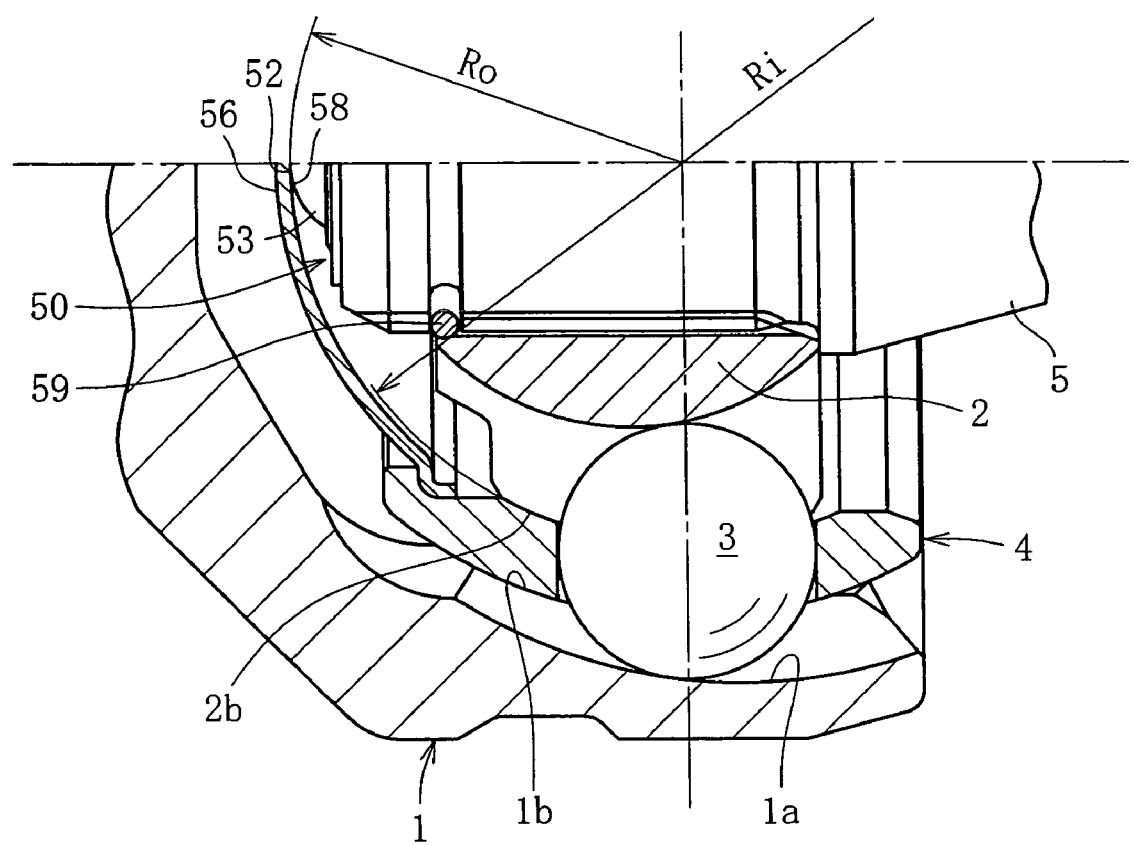
FIG. 4 is an enlarged sectional view of the plunger unit section.

In the fixed-type constant velocity universal joint, as shown in FIGS. 1, 3, and 4, a plunger unit 50 is attached to an axial end of the connecting shaft 5 connected to the steering shaft through the yoke 70 in order to restrain rotational backlash. The plunger unit 50 is an assembly which comprises a ball 53 being a press member having a press section 52 in its end, a compression coil spring 54 being an elastic member, and a case 55 being a container member for containing the ball 53 and the compression coil spring 54. The compression coil spring 54 is a source of elastic force which presses the ball 53 on the deeper side of the outer member 1 (in a ball protruding direction).

The structure of attaching the foregoing plunger unit 50 to the connecting shaft 5 is as follows. In this embodiment, a press section 52 is formed in the connecting shaft 5, and a receiving section 58 is formed in the retainer 4. The receiving section 58, however, may be provided in the connecting shaft 5 and the press section 52 may be provided in the retainer 4 contrarily, as long as the inner member 6 and the retainer 4 are relatively pressed.

The plunger unit 50, as shown in FIG. 3, is fixed when its case 55 is press-fitted or bonded to a recessed section 5a formed in the axial end of the connecting shaft 5. When the case 55 is completely fixed, a flange 55b of the case 55 engages with an axial end surface of the connecting shaft 5, so that the position of the plunger unit 50 is fixed with reference to the axial end surface. In other words, it is possible to fix the position of the plunger unit 50 if there are variations in the depth of the recessed section 5a of the connecting shaft 5 due to its processing tolerance, because the depth of the recessed section 5a is larger than the axial length of the case 55 of the plunger unit 50 and the flange 55b engages with the axial end surface of the connecting shaft 5.

The case 55 of the plunger unit 50 is in the shape of a cylinder with a bottom, and an engaged section 55a protruding on the side of an inside diameter is provided at the edge of its opening end. Since the inside diameter φd of the engaged section 55a is smaller than the outside diameter φD of the ball 53, it is possible to prevent the ball 53 from dropping off. Accordingly, the ball 53, the compression coil spring 54, and the case 55 are assembled into a unit. As to means for providing an engaged section to prevent the ball 53 from dropping off, various structures are available in addition to forming the engaged section 55a by swaging the edge of the opening end of the case 55 along the whole circumference.

As shown in FIGS. 3 and 4, a receiver member 56 is attached to an end section of the retainer 4 on the deeper side of the outer member 1. The receiver member 56 is in the shape of a lid covering an opening at an end of the retainer 4, and is composed of a spherical section 56a in a partial spherical shape and an attachment section 56b formed in the outer periphery of the spherical section 56a in the shape of a ring. The inner surface (surface opposed to the connecting shaft 5) of the spherical section 56a is a concave spherical surface which functions as the receiving section 58 for receiving pressure from the press section 52. The attachment section 56b is fixed in the end of the retainer 4 by proper means such as press or welding.

To smoothly slide the press section 52 of the plunger unit 50 on the receiving section 58 of the receiver member 56 when the connecting shaft 5 of the constant velocity universal joint takes an operating angle, as shown in FIG. 4, the inside diameter Ro of the receiving section 58 in a recessed spherical shape is set larger than the outside diameter (φD/2) (refer to FIG. 3) of the ball 53 having the press section 52 (Ro>(φD/2)). To prevent the interference between the receiver member 56 and the inner joint member 2 in taking an operating angle θ, the radius Ro of the inside diameter of the receiving section 58 is set larger than the radius Ri of the spherical inner surface of the retainer 4 (Ro>Ri).

In the foregoing structure, when a serration shaft section of the connecting shaft 5 and the inner joint member 2 are coupled by serrations and attaching a snap ring 59 completely couples both (refer to FIGS. 3 and 4), the press section 52 of the plunger unit 50 and the receiving section 58 of the receiver member 56 come into contact with each other, and then the ball 53 is retracted and the compression coil spring 54 is compressed. Since the position of the plunger unit 50 is fixed with respect to the axial end surface of a connecting shaft 5, as described above, it is possible to always keep the contact state between the press section 52 and the receiving section 58 by stabilizing the attachment state of the press section 52, and hence pressure from the press section 52 can securely act on the receiving section 58.

In this embodiment, in addition to structure described above, the primary diameters of the joint are set as follows. As described above, (I) it is preferable that the ratio r1 (=$PCD_{BALL}/D_{BALL}$) between the pitch circle diameter $PCD_{BALL}$ ($PCD_{BALL}$=2×PCR) of the ball 3 and the diameter $D_{BALL}$ thereof is set in a range of $1.5 \leq r1 \leq 4.0$, and more preferably in a range of $2.3 \leq r1 \leq 4.0$ for the purpose of ensuring the strength of the outer member and the like, ensuring load-carrying capacity, and ensuring durability. (II) The ratio r2 (=$D_{OUTER}/PCD_{SERR}$) between the outside diameter $D_{OUTER}$ of the outer member 1 and the pitch circle diameter $PCD_{SERR}$ of the serrations (or splines) 2*d* of the inner joint member 2 is set in a range of $3.0 \leq r2 \leq 5.0$. The structure of the above (I) may be adopted alone.

The offset amount (F) of the track grooves 1*a* and 2*a* may be set as follows. As described above, (III) it is preferable that the offset amount (F) of the track grooves 1*a* and 2*a* is set so that the ratio R1 (=F/PCR) between a track offset F and PCR is in a range of $0.109 \leq R1 \leq 0.162$ for the purpose of ensuring allowable load torque, ensuring the strength of the retainer, reduction in a track load, ensuring durability, and ensuring a maximum operating angle.

Figure 5A:
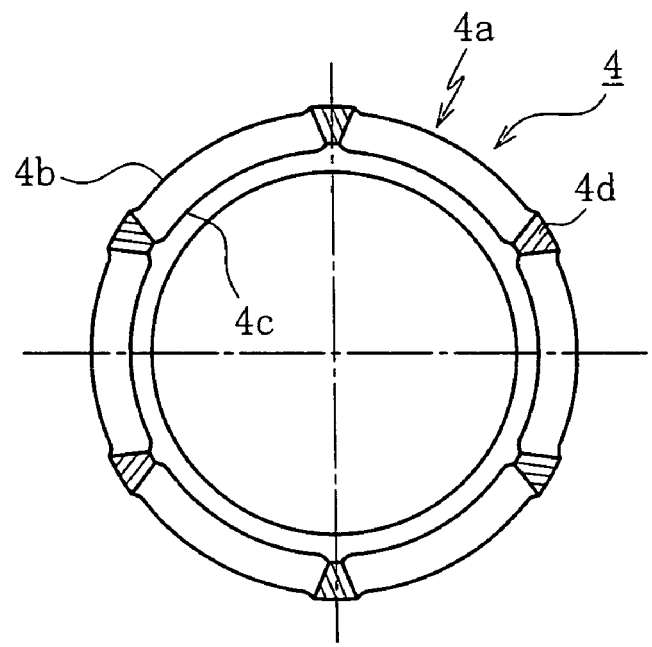
FIG. 5(a) is a cross sectional view of a retainer.
Figure 5B:
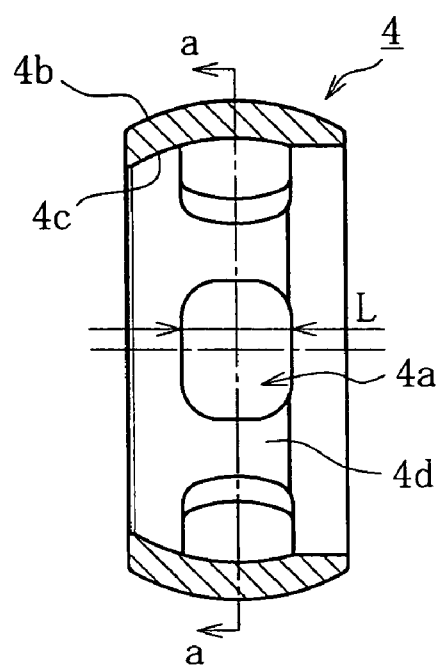
FIG. 5(b) is a longitudinal sectional view of a retainer.

FIG. 5 shows the retainer 4. The retainer 4 is provided with six window-shaped pockets 4*a* for containing and holding the torque transmission balls 3 and pillar sections 4*d* between the pockets 4*a* adjoining in the circumferential direction. In this embodiment, the circumferential lengths of each pocket 4*a* are all equal. The difference (=L−d) between the axial dimension L of the pocket 4*a* and the diameter d of the torque transmission ball 3 at the start of operation of the joint, that is, the axial initial clearance between them is controlled in a range of 0 to +50 μm, and more preferably in a range of 0 to +30 μm. The retainer 4 is made of, for example, carburized steel which has a carburized layer in its surface due to carburizing and quenching. Chrome steel, chromium molybdenum steel, nickel chrome molybdenum steel, or the like is available as the carburized steel.

Figure 6:
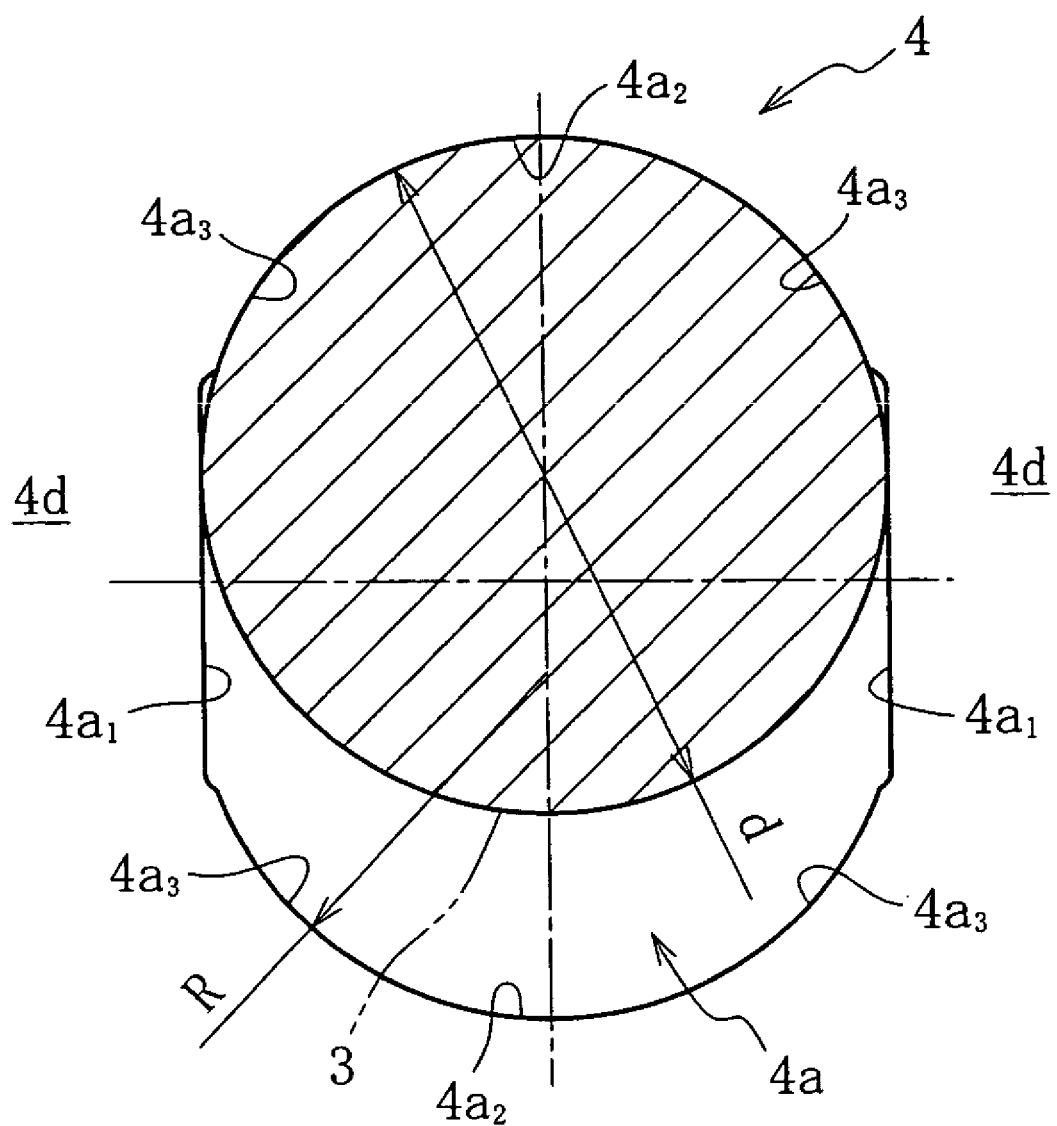
FIG. 6 is an enlarged plan view showing the periphery of a pocket of the retainer.
Figure 7:
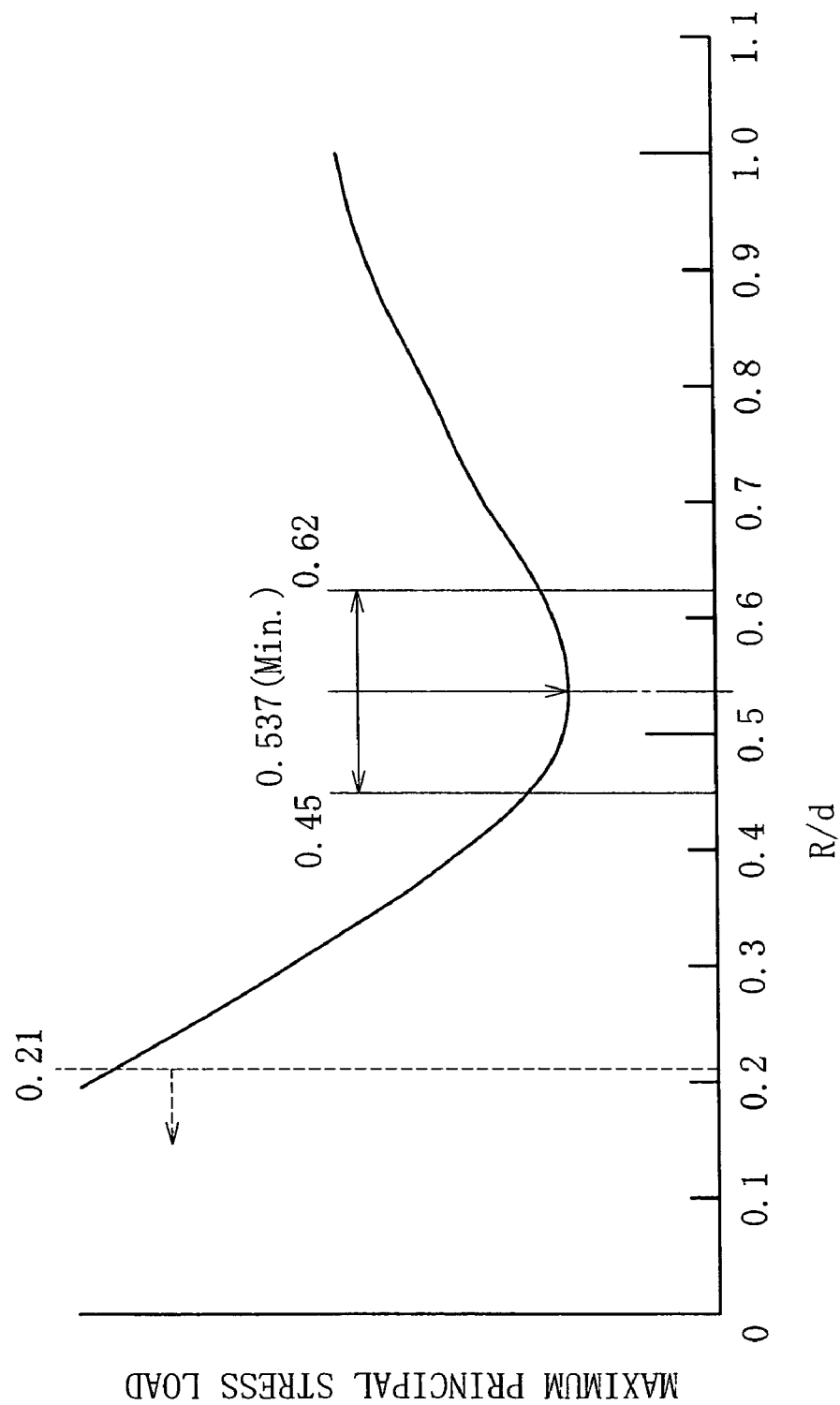
FIG. 7 is a graph showing the relationship between a ratio (R/d) and a maximum principal stress load of a pillar section.
Figure 9A:
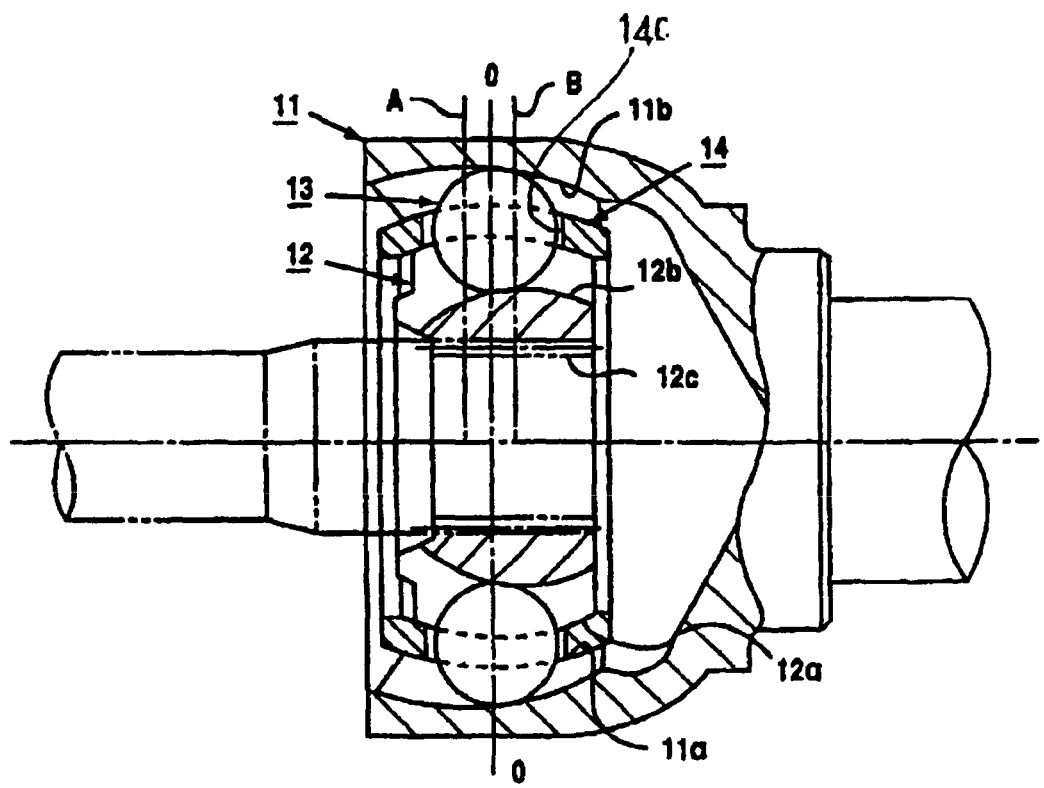
FIG. 9(a) is a longitudinal sectional view showing a conventional constant velocity universal joint.
Figure 9B:
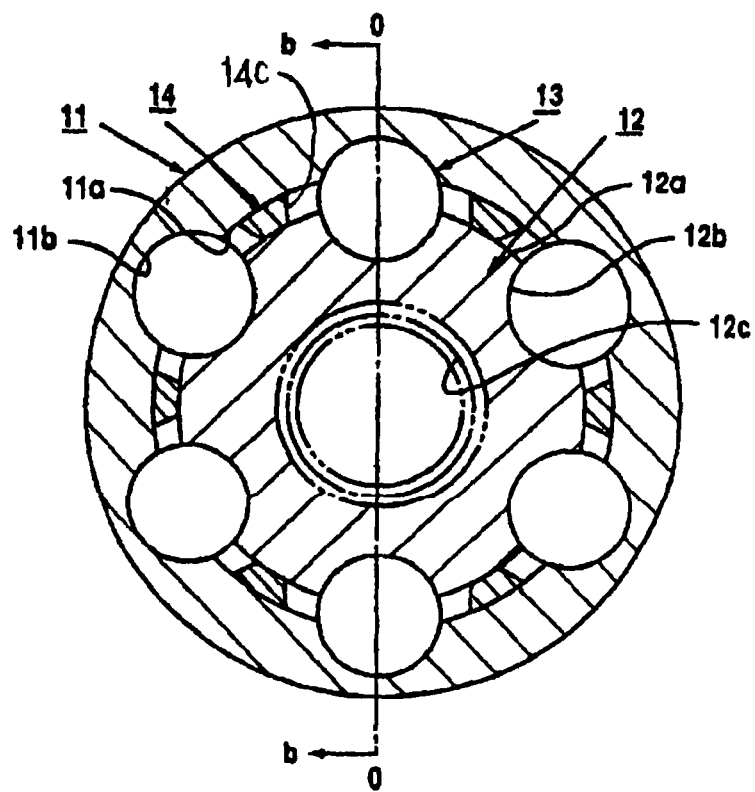
FIG. 9(b) is a cross sectional view showing a conventional constant velocity universal joint.
Figure 10A:
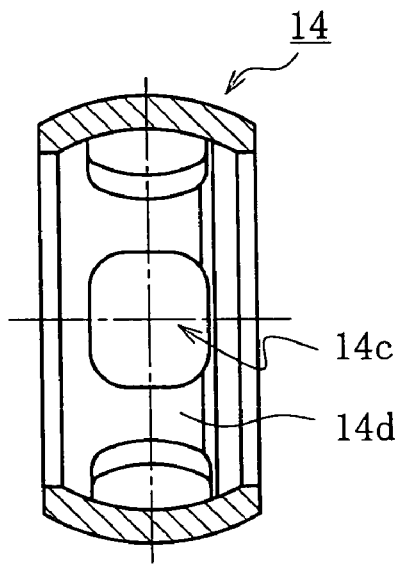
FIG. 10(a) is a longitudinal sectional view of a conventional retainer.
Figure 10B:
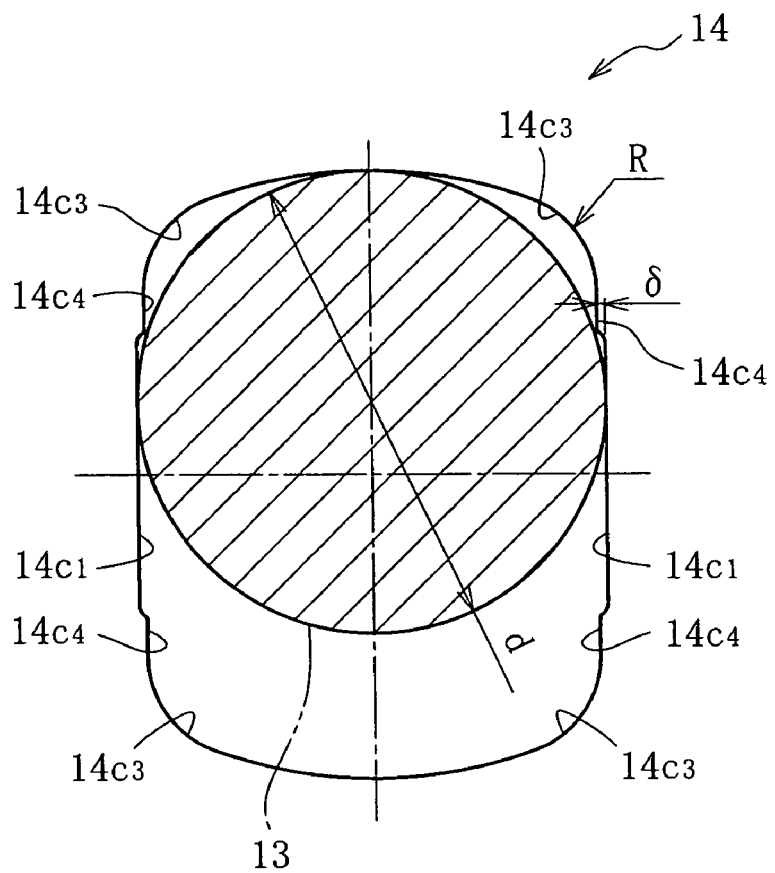
FIG. 10(b) is an enlarged plan view showing the periphery of a pocket in the conventional joint.

As shown in FIG. 6 in enlargement, the pocket 4*a* of the retainer 4 comprises a pair of axial walls 4*a*1 opposed in the axial direction of the retainer 4, a pair of circumferential walls 4*a*2 opposed in the circumferential direction, and corner round sections 4*a*3 connecting the axial wall 4*a*1 and the circumferential wall 4*a*2. In this embodiment, the ratio (R/d) of the radius of curvature R of the corner round section 4*a*3 to the diameter d of the torque transmission ball 3 is set in a range of $0.45 \leq R/d \leq 0.62$. Also, the circumferential wall 4*a*2 and the corner round sections 4*a*3 are drawn in a single arc with the radius of curvature R. Furthermore, as to the axial walls 4*a*1, grinding, cutting by quenched steel, or the like is carried out after the heat treatment (carburizing and quenching) of the retainer 4 in order to reduce variations in a processing margin (the circumferential walls 4*a*2 and the corner round sections 4*a*3 are remained as-is after a cutting process by press).

The invention claimed is:

1. A constant velocity universal joint comprising:
   an outer member which is provided with a spherical inner surface in which six track grooves are formed;
   an inner member which is provided with a spherical outer surface in which six track grooves are formed;
   six balls disposed in respective wedge-shaped ball tracks formed by the track grooves of the outer member and the track grooves of the inner member;
   a retainer disposed between the spherical inner surface of the outer member and the spherical outer surface of the inner member to hold the balls; and
   an elastic member applying an elastic force in an axial direction between the inner member and the retainer to press the balls toward a narrower side of the wedge-shaped ball tracks;
   wherein a ratio r1 (=$PCD_{BALL}/D_{BALL}$) of a pitch circle diameter ($PCD_{BALL}$) of the ball to a diameter ($D_{BALL}$) of the ball is in a range of $1.5 \leq r1 \leq 4.0$, a ratio R1 is defined by F/PCR, where F is an offset amount between the center of the track grooves of both the inner member and the outer member with respect to a center of the spherical inner surface and the spherical outer surface, and PCR is a length of a segment connecting the center of the inner track grooves with the outer track grooves and the center of the ball, and the ratio R1 (=F/PCR) is in a range of $0.109 \leq R1 \leq 0.162$.

2. A constant velocity universal joint according to claim 1, wherein a ratio r2 (=$D_{Outer}/PCD_{SERR}$) of an outside diameter ($D_{OUTER}$) of the outer joint member to a pitch circle diameter ($PCD_{SERR}$) of teeth of the inner member is in a range of $3.0 \leq r2 \leq 5.0$.

3. A constant velocity universal joint according to claim 1, wherein a contact angle (θ) between the track and the ball is in a range of $30° \leq \theta \leq 40°$.

4. A constant velocity universal joint for steering according to claim 1, wherein lengths of a plurality of pockets corresponding to a plurality of the track grooves in a circumferential direction of a window are all equal.

* * * * *